United States Patent [19]

Sakuma et al.

[11] Patent Number: 4,776,624
[45] Date of Patent: Oct. 11, 1988

[54] REARVIEW MIRROR MOUNTING APPARATUS FOR VEHICLE

[75] Inventors: Tsutomu Sakuma, Shiki; Nobuyoshi Daigo, Kawagoe, both of Japan

[73] Assignees: Honda Giken Kogyo Kabushiki Kaisha; Kabushiki Kaisha Matsuyama Seisakusho, both of Tokyo, Japan

[21] Appl. No.: 32,686

[22] Filed: Apr. 1, 1987

[30] Foreign Application Priority Data

Apr. 3, 1986 [JP] Japan .................................. 61-75503

[51] Int. Cl.$^4$ .............................................. B60R 1/06
[52] U.S. Cl. .................................. 296/1.1; 248/475.1; 296/78.1; 350/631
[58] Field of Search ..................... 248/475.1; 296/78.1, 296/1 R; 403/11, 12; 350/631, 632

[56] References Cited

U.S. PATENT DOCUMENTS

| 4,234,153 | 11/1980 | Chihara | 248/475.1 |
| 4,253,633 | 3/1981 | Takegawa | 248/475.1 |
| 4,394,066 | 7/1983 | Sharp | 248/475.1 |
| 4,592,529 | 6/1986 | Suzuki | 248/475.1 |

FOREIGN PATENT DOCUMENTS 1330782  5/1963  France .............................. 248/475.1
46-23548 8/1971 Japan .
50-9699  3/1975 Japan .
52-24900 6/1977 Japan .
60-2028  1/1985 Japan .

Primary Examiner—Robert R. Song
Attorney, Agent, or Firm—Armstrong, Nikaido, Marmelstein & Kubovcik

[57] ABSTRACT

A rearview mirror mounting apparatus for detachably mounting a rearview mirror onto a side portion of a vehicle body of a vehicle such as automobile, motorcycle and the like. Between a mounting seat formed on the rearview mirror and the vehicle body, there is provided an elastic connecting piece having an excessive length when the mounting seat is fixed to the vehicle body by a bolt or the like. One end of the connecting piece is retainably engagable with the mounting seat and the other end with the vehicle body. The connecting piece is contained within the rearview mirror mounting apparatus. Although, the rearview mirror is detachable from the vehicle body, it cannot be separated apart from the vehicle body any further than the length of the connecting piece since the connecting piece is retainably engaged at one end with the mounting seat of the rearview mirror and at the other end with the vehicle body.

8 Claims, 3 Drawing Sheets

# REARVIEW MIRROR MOUNTING APPARATUS FOR VEHICLE

BACKGROUND OF THE INVENTION

This invention relates to a rearview mirror to be mounted onto a side portion of a vehicle body of vehicles such as automobiles, motorcycles and the like, and more particularly to an apparatus for detachably mounting such rearview mirror onto a side portion of a vehicle body.

In conventional automobiles, motorcycles and the like, there are many in which rearview mirrors are mounted one each onto both side portions of a front vehicle body through a mounting seat formed on the rearview mirror. There are some in which such rearview mirror is detachably mounted onto a vehicle body so as to be removed by means of external forces.

Such conventional rearview mirrors to be detachably mounted onto a vehicle have such inconveniences as that the rearview mirrors are often stollen due to easy detachment and that when rearview mirrors are detached due to necessity such as, for example, maintenance work of the vehicle body, such detached rearview mirrors cannot be temporarily placed safely on or retainably engaged with the vehicle body at its convenient places, i.e. places not far from the places where they were mounted.

SUMMARY OF THE INVENTION

It is therefore a general object of the present invention to provide a rearview mirror mounting apparatus in which the above-mentioned inconveniences are eliminated and yet the structure is simple.

An apparatus according to the present invention for detachably mounting a rearview mirror onto a side portion of a vehicle body includes a mounting seat formed on a rearview mirror and a flexible connecting piece disposed between the mounting seat and a vehicle body, both ends of the connecting piece being adapted for retainable engagement with the mounting seat and the vehicle body respectively, the mounting piece having an excessive length and being hidden from the outside when the rearview mirror is mounted onto the vehicle body.

According to the present invention, any attempt to take away the rearview mirror by detaching it from the vehicle body will not be successful because both ends of the connecting piece are retainably engaged at one end with the rearview mirror mounting seat and at the other end with the vehicle body and, therefore, the rearview mirror cannot be separated apart from the vehicle body any further than the length of the connecting piece. Because of the foregoing, the rearview mirror is safely prevented from being stollen. Further, even if the rearview mirror is unexpectedly dropped during maintenance work of the vehicle body, it will not reach the ground since it is held by the connecting piece. Furthermore, since the connecting piece has an excessive portion or exessive length long enough and is flexible, the mounting and detaching work of the rearview mirror is greatly facilitated. In addition, since the connecting piece is provided within the mounting apparatus and hidden from the outside, it is not visible and does not adversely affect the appearance of the mirror.

DETAILED DESCRIPTION OF THE PREFERRED EMBODIMENTS

Figure 1:
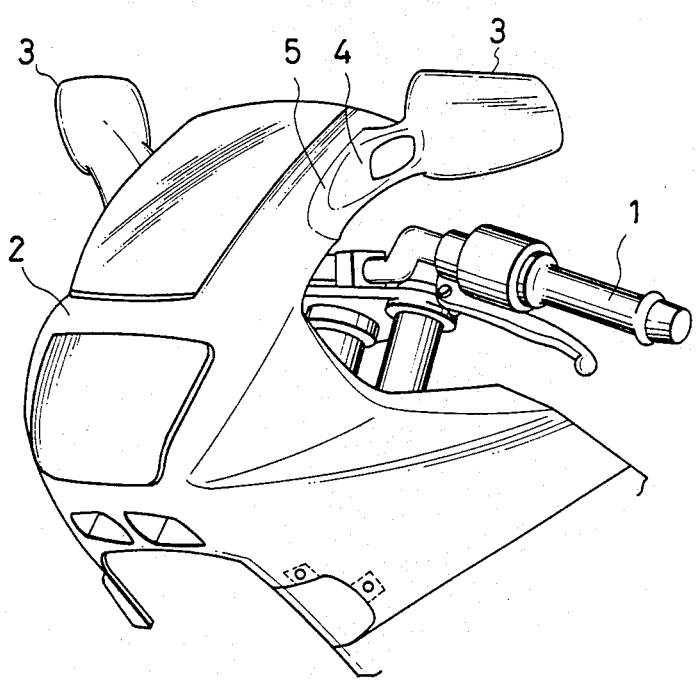
FIG. 1 is a perspective view of a front upper portion of a motorcycle in which the present invention is incorporated.

One preferred embodiment of the present invention will be described with reference to the accompanying drawings. FIG. 1 illustrates a perspective view, when viewed from the front left, of a front upper portion of a motorcycle, in which the present invention is incorporated. In the figure, 1 denotes a handle. A front part of the handle 1 is covered with a fairing 2 which forms a part of a vehicle body. Both side portions of the fairing 2 are respectively provided with one each of rearview mirrors 3,3 projecting sidewardly therefrom. The rearview mirror 3 has a mounting arm 4. An end portion of the mounting arm 4 acts as a mounting seat 5. The rearview mirror 3 is mounted onto the vehicle body with the mounting seat 5 disposed along a side surface of the fairing 2.

Figure 2:
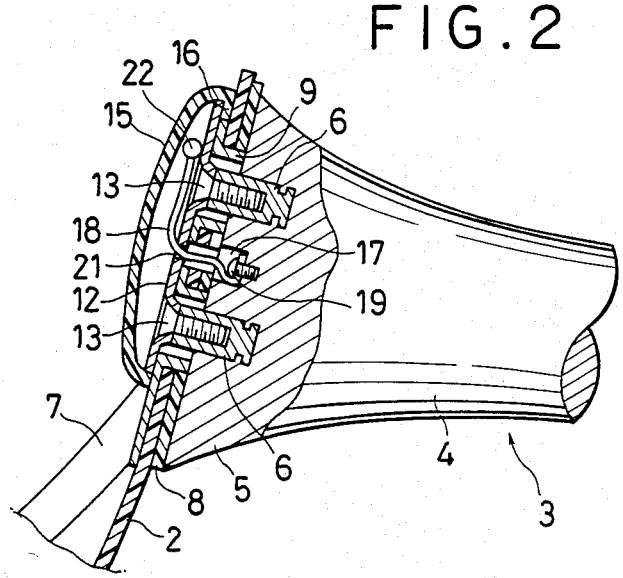
FIG. 2 is a sectional view of a rearview mirror mounting portion of the motorcycle.
Figure 3:
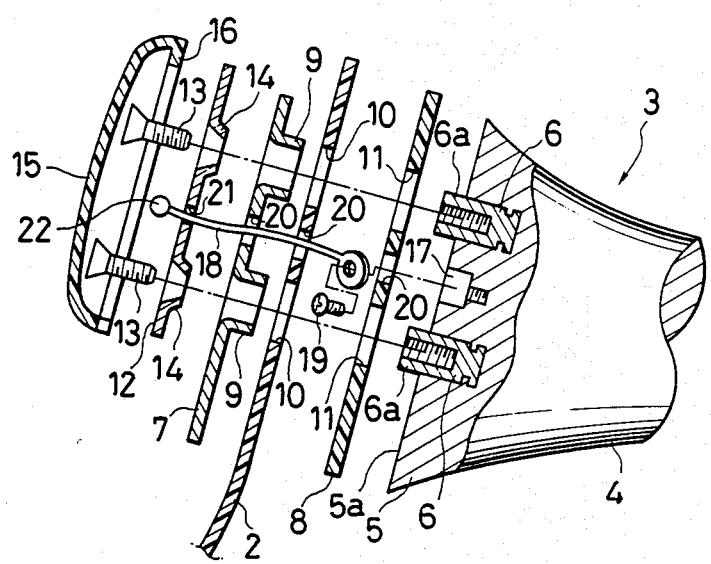
FIG. 3 is an exploded view of component parts constituting the rearview mirror mounting portion.

FIG. 2 illustrates a sectional view of a mounting portion of the rearview mirror 3 to be mounted onto the fairing 2. FIG. 3 illustrates an exploded view showing component parts forming the mounting portion. The mounting arm 4 is made of, for example, a comparatively hard synthetic resin material. A nut member 6 is buried in the mounting seat 5 with a thread hole opened up on a mounting face 5a of the mounting seat 5. The fairing 2 is supported on a frame 7. The rearview mirror 3 is abutted at the mounting face 5a of the mounting seat 5 against a surface of the fairing 2 through a rubber-like shock absorbing plate 8 and fixed to the frame 7 through the fairing 2.

An external end portion of the nut member 6, as designated by symbolic numeral 6a of FIG. 3, projects from the mounting face 5a of the mounting seat 5. The frame 7 is provided with a cylindrical portion 9 which is larger in diameter than the projecting portion 6a. The fairing 2 and the shock absorbing plate 8 are respectively provided with holes 10,11 which the cylindrical portion 9 passes through. When the mounting seat 5 is abutted against the surface of the fairing 2 through the shock absorbing plate 8 as described in the foregoing, the projecting portion 6a of the nut member 6 extends inside of the cylindrical portion 9.

Figure 5:
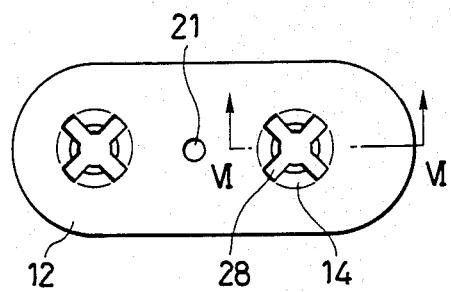
FIG. 5 is a plan view of a presser plate.
Figure 6:
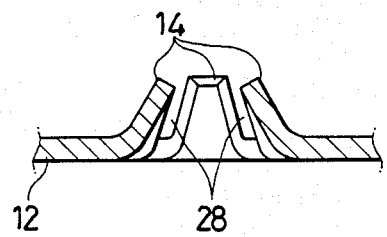
FIG. 6 is a sectional view taken along the line VI—VI of FIG. 5.

The rearview mirror 3 is fixed to the vehicle body by a bolt 13 bolted into the thread hole of the nut member 6 through a presser plate 12 disposed along an internal face of the frame 7, with the frame 7, fairing 2 and shock absorbing plate 8 tightened between the presser plate 12 and mounting seat 5. The presser plate 12 is provided with a circular and elastic projecting edge portion 14 fitted into an opening of the cylindrical portion 9. The projecting edge portion 14 has notches 28 to afford elasticity (see FIGS. 5 and 6). The projecting edge portion 14 serves as a seat face which is tightened by a head portion of the bolt 13. The external diameters of the projecting portion 14 and the head portion of the bolt 13 are smaller than the internal diameter of the cylindrical portion 9. Due to the foregoing, when an excessive load is incurred to the rearview mirror 3, the projecting portion 14 is elastically deformed to permit the rearview mirror 13 to escape from the vehicle body together with the bolt 13. A cap 15 is mounted to an internal side of the frame 7 by inserting an engaging portion 16 projecting from its internal periphery between the presser plate 12 and fairing 2 as shown in FIG. 2 and adapted to cover a rearview mirror mounting portion from inside of the frame 7.

The mounting seat 5 of the rearview mirror 3 is formed with a recess 17 which is opened up at the central portion of the mounting face 5a. A connecting piece 18 is fixed at its one end to a bottom portion of the recess 17 by a screw 19. The connecting piece 18 is a flexible piece which can be freely bent and has an elongated string or band shape. It may be a string or a band made of a usual fabric material, rubber material, resin material or the like. Otherwise, it may be a wire, a spring and the like made of a metallic material. The connecting piece 18 is pierced into a through hole 21 formed on the presser plate 12 and further into through holes 20,20 formed on the frame 7, fairing 2 and the shock absorbing plate 8 in alignment relation respectively and fixed at the end to the bottom portion of the recess 17 as stated above. The free end or excess length of the connecting piece 18 is contained within the cap 15 in its free state. A retaining piece 22 is fixed to a free end of the connecting piece 18. The size of the retaining piece 22 is larger than the diameter of the through hole 21. The through hole 20 is preferably formed large in diameter so that the connecting piece 18 can be easily attached to the recess 17.

Therefore, even if an attempt is made to completely take away the rearview mirror 3 by loosening the bolt 13 or forcefully pulling the mirror, it will result in failure because when the rearview mirror 3 is separated apart from the fairing 3 by a distance equal to the length of the connecting piece 18, the retaining piece 22 is engaged with and retained by the through hole 21 and the rearview mirror 3 cannot be separated apart any further from the fairing 2. In this way, the rearview mirror 3 is safely prevented from being stollen. Further, when the rearview mirror 3 is detached from the fairing 2 due to necessity such as maintenance work, such detached rearview mirror 3 will not be dropped on the ground by mistake. Furthermore, since the detatched rearview mirror 3 is always held in the vicinity of the mounting portion by the connecting piece 18, remounting work is easy to perform and the mirror is not likely to be misplaced. In addition, since the connecting piece 18 has an excessive length and is long enough to permit movement of the mirror, the rearview mirror 3 can be freely moved during the mounting work of the mirror 3. Thus, the mounting work of the mirror 3 is greatly facilitated.

Figure 4:
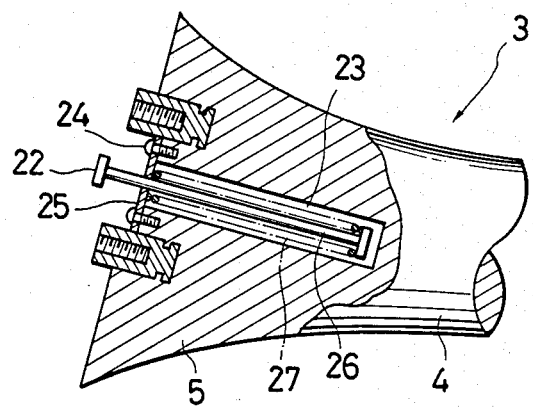
FIG. 4 is a sectional view of a mounting seat portion of a rearview mirror according to another embodiment of the present invention.

In the above-described embodiment, the length of the connecting piece 18 is substantially greater than the distance between the mounting seat 5 and the frame 7 as shown by FIG. 2 and the excess length or excessive portion of the connecting piece 18 is disposed in its freely movable state at a place covered with the cap 15 behind the frame 7. Alternatively, the connecting piece 18 may be disposed at the rearview mirror 3 side. FIG. 4 illustrates one such embodiment. As seen, FIG. 4 illustrates only the mounting seat 5 portion of the rearview mirror 3. In this embodiment, the mounting seat 5 at the tip end of the mounting arm 4 of the rearview mirror 3 is formed with a recess 23 which is considerably deeper than the recess 17. The depth of the recess 23 is almost equal to the length of the connecting piece 18. An opening of the recess 23 is covered with a stopper piece 25 which is fixed to the mounting seat 5 by a screw 24 and a connecting piece 26 which is similar to the afore-mentioned connecting piece 18 extends piercing through a through hole formed at the central portion of the stopper piece 25. On an end portion of the connecting piece 26 at its vehicle body side, a retaining piece 22 similar to the one in the preceding embodiment is fixed. The retaining piece 22 is retainably engaged with the through hole 21 of the presser 12 in the same manner as already described with reference to FIGS. 2 and 3. Also abutting against the stopper piece 25 is one end of a tubular-shaped flexible elastic piece 27. The flexible elastic piece 27 comprises, for example, an accordion-like rubber piece or a coil spring and extends toward inside of the recess 23 and the other end thereof abuts against the end portion of the connecting piece 26. In this embodiment, the connecting piece 26 is held in its linear state and appropriately tensioned is placed in the recess 23 with one end of the connecting piece 26 retainably engaged with the through hole 21 through the retaining piece 22 and the other end pulled by the flexible elastic piece 27 toward the bottom of the recess 23. When the rearview mirror 3 is separated apart from the surface of the fairing 2, the flexible elastic piece 27 is contracted to permit the connecting piece 26 to be pulled out from the recess 23. However, the rearview mirror 3 will not be separated apart any further than the length of the connecting piece 26.

What is claimed is:

1. A rearview mirror mounting apparatus for detachably mounting a rearview mirror onto a side portion of a vehicle body, including
    a mounting seat formed on a rearview mirror,
    a connecting means for detachably connecting said mounting seat to said vehicle body, said connecting means being adapted for withdrawal from said vehicle body together with said rearview mirror when an excessive load is applied to said rearview mirror, and
    a flexible connecting piece disposed between said mounting seat and said vehicle body, both ends of said connecting piece being adapted for retainable engagement with said mounting seat and said vehicle body respectively, said connecting piece having a length substantially greater than the distance between said mounting seat and said vehicle body when said mounting seat is mounted to said vehicle body and being hidden from view when the rearview mirror is mounted to the vehicle body.

2. A rearview mirror mounting apparatus as defined by claim 1, wherein said connecting piece extends through a hole formed through a vehicle body member with one end of said connecting piece fixed to said mounting seat, and the other end of said connecting piece fixedly provided with a retaining piece larger than said hole.

3. A rearview mirror mounting apparatus as defined by claim 2, wherein a portion of the length of said connecting piece extends through said hole through said vehicle body member when said rearview mirror is mounted onto said vehicle body and said portion of the length of said connecting piece is covered with a cap from inside of the vehicle body.

4. A rearview mirror mounting apparatus as defined by claim 1, wherein a portion of the length of said connecting piece is received in a recess formed on said mounting seat when the rearview mirror is mounted onto the vehicle body.

5. A rearview mirror mounting apparatus as defined by claim 4, wherein said recess has a depth substantially equal to the length of said connecting piece and one end portion of said connecting piece within said recess is biased toward an inner end of said recess by a flexible elastic piece disposed between said one end portion and said mounting seat.

6. A rearview mirror mounting apparatus for detachably mounting a rearview mirror onto a side portion of a vehicle body including a mounting seat formed on said rearview mirror, a nut embedded in said mounting seat with an end portion projecting from a mounting face of said mounting seat, a frame for supporting said rearview mirror having a cylindrical portion which receives said end portion of said nut, a bolt screwed into said nut for attaching said rearview mirror to said frame, a presser plate disposed along said frame and having a circular elastic projecting edge portion fitted into said cylindrical portion and provided with notches, said projecting edge portion serving as a seat face which is tightened by a head portion of said bolt, and a flexible connecting piece disposed between said mounting seat and said vehicle body through said frame and said presser plate, said connecting piece having two ends with one of said ends adapted for retainable engagement with said mounting seat and the other end adapted for retainable engagement at a location on a side of said frame opposite from said mounting seat, said connecting piece having a length substantially greater than the distance between said frame and said mounting seat when said mounting seat is mounted to said frame and being hidden from view when the rearview mirror is mounted to the vehicle body.

7. A rearview mirror mounting apparatus as defined by claim 6, wherein said other end of said connecting piece is adapted for retainable engagement with said frame.

8. A rearview mirror mounting apparatus as defined by claim 6, wherein said other end of said connecting piece is adapted for retainable engagement with said presser plate.

* * * * *